United States Patent Office 3,598,530
Patented Aug. 10, 1971

3,598,530
DETERMINATION OF UNSATURATED HYDROCARBONS
Ellsworth R. Fenske, Palatine, and Leonard F. Pasik, Mount Prospect, Ill., assignors to Universal Oil Products Company, Des Plaines, Ill.
No Drawing. Filed Sept. 5, 1968, Ser. No. 757,799
Int. Cl. G01n 9/00, 25/18, 31/08
U.S. Cl. 23—230
5 Claims

ABSTRACT OF THE DISCLOSURE

Method for quantitatively determining the presence of an unsaturated hydrocarbon compound contained in a mixture of compounds using improved chromatographic techniques.

BACKGROUND OF THE INVENTION

This invention relates to a method for quantitatively determining the presence of a chemical compound or compounds in admixture with other chemical compounds. It particularly relates to a method for quantitatively determining the amount of chemical unsaturation of a process stream. It specifically relates to a method for quantitatively determining the presence of straight-chain olefinic hydrocarbons in admixture with saturated hydrocarbons.

In many chemical processes unsaturated compounds are frequently used as reactants with other compounds to form predetermined desired products. For example, ethylene is used as a reactant with benzene to produce high purity ethylbenzene which may then be hydrogenated to styrene, a chemical of well known utility. The alkylation process wherein isobutane is reacted with butylenes and amylenes is another well known process which depends upon unsaturation for success of the reaction. In recent times, longer chain olefins, such as those from $C_9$ through $C_{16}$ have been used in the production of biodegradable detergents.

Therefore, there is a need in the art to have a facile and economical method for the determination of chemical unsaturation in a process stream not only for product purity purposes, but for process control purposes.

It has been the practice in the prior art to use the well-known chromatography technique in order to determine the presence of a particular chemical compound in admixture with other chemical compounds. It is possible, of course, to use a gas chromatograph to obtain a resolution between olefinic hydrocarbons and saturated hydrocarbons. However, the chromatography technique is extremely complex, relatively slow and has several distinct disadvantages for process control work which are well known to those skilled in the art.

For example, a typical gas chromatograph employs a tubular column either packed with finely divided materials or having an inner wall coated with a material having the necessary characteristics for adsorbing and desorbing gases, etc. A diluent or carrier gas is passed through such column and the sample to be analyzed is swept through the column by the carrier gas. The function of the column is to selectively adsorb and desorb the various constituents or compounds of the chamber at varying rates and thereby effectuate a separation as a function of time. As the components of the chamber are independently eluted by the column material and emerge from the column, they are detected by any suitable means for detecting vapor concentration in a gas stream. These detection devices utilize differences in thermal conductivity, ionization potential or density between incoming or outgoing gas utilized in connection with a recording potentiometer to plot the potentiometer deflection against time, thereby providing both a quantitative and qualitative analysis of the components of the mixture.

In view of the strong need in the art for a method of quantitatively determining the presence of an unsaturated compound contained in a mixture of compounds, the present invention provides an improvement in the prior art of chromatography in order to arrive at a beneficial, facile and economical result.

SUMMARY OF THE INVENTION

Accordingly, it is an object of this invention to provide an improved chromatographic method.

A further object of this invention is to provide an improved method for quantitatively determining the presence of a chemical compound or compounds in admixture with other chemical compounds utilizing a chromatographic technique.

It is a specific object of this invention to provide an improved chromatographic method for quantitatively determining the amount of chemical unsaturation of a process stream.

Therefore, the practice of the present invention provides a method for the continuous analysis of unsaturated hydrocarbons contained in a fluid mixture comprising saturated and unsaturated hydrocarbons which method comprises the steps of: (a) admixing said fluid mixture with a carrier gas comprising an inert diluent and a known amount of hydrogen; (b) introducing said admixture into a conversion zone under conditions sufficient to saturate said unsaturated hydrocarbons by consuming at least part of said hydrogen; (c) passing the total effluent from the conversion zone into a chromatographic separation zone under conditions sufficient to separate hydrogen from the hydrocarbons contained in the conversion zone effluent; (d) detecting the hydrogen which emerges from said separation zone; and, (e) determining from the hydrogen detected the amount of hydrogen in said effluent as a measure of the unsaturated hydrocarbons present in said fluid mixture.

Another embodiment of this invention includes the method hereinabove wherein said carrier gas comprises from 10% to 50% by volume hydrogen.

In essence, therefore, the present invention provides an improved method for the continuous analysis and monitoring of the olefin content of hydrocarbon streams by measuring the hydrogen disappearance chromatographically through a hydrogenation step prior to the chromatographic column. In brief, the apparatus used in the practice of this invention could be a chromatographic column containing first a hydrogenation catalyst filled section followed by a, for example, silicon rubber filled section. The resolution necessary in the chromatographic section is only that which is sufficient to separate hydrogen from hydrocarbons. Therefore, the hydrocarbon portion of the sample can be detected as a lumped peak with the hydrogen peak being adequately separated for quantitative determination of its presence.

DETAILED DESCRIPTION OF THE INVENTION

The process stream, or sample to be analyzed, containing the unsaturated compound may, of course, be derived from a variety of sources. The only requirement as to suitability for use in the practice of this invention is that the sample must be capable of being processed through chromatographic separation devices. The inventive method has been found to work satisfactorily with unsaturated hydrocarbon compounds containing from 2 to 16 carbon atoms per molecule. These unsaturated compounds can be alkenes and alkynes, whether substituted or unsubstituted. For example, unsaturated hydrocarbons to be analyzed include ethylene, propylene, 1,4-butadiene, hexene- 1, 2-chloro-1-heptene, 3-phenyl-1-hexene, and the like. Examples of suitable alkenes include acetylene, propyne-1, phenyl acetylene, 3-chloro-1-propyne, 3-phenyl-1-propyne, and the like. Another class of emerger suitable unsaturated compounds include those which are non-cyclic in structure and which may contain from 9 to 16 carbon atoms per molecule. The preferred embodiment of this invention is directed to the analysis and monitoring of unsaturated hydrocarbons in this latter class.

The conversion zone referred to in the practice of this invention is that reaction which chemically consumes hydrogen to such an extent that the unsaturation of the sample to be analyzed is removed. This chemical consumption of hydrogen must be performed under conditions which do not substantially crack or fragment the sample. That is not to mean, however, that there must be a 100% conversion of the unsaturated hydrocarbons to saturated hydrocarbons in the conversion zone. It is only necessary that the unsaturation be removed to the extent required by the use to which the result is to be used. For example, a result that measures unsaturation to within plus or minus 5 volume percent may be adequate for process stream control use whereas an analytical result having an accuracy of plus or minus 1% may be necessary for product purity control purposes. Those skilled in the art from the teachings presented herein will be able to determine the degree to which chemical unsaturation must be removed in the conversion zone.

The conversion zone is, preferably, a hydrogenation zone containing a catalytic agent. Suitable catalyst for carrying out the hydrogenation reaction include, for example, mixtures of the oxides and/or sulfides of cobalt and molybdenum or of nickel and tungsten, preferably, supported on a carrier such as alumina or silica, containing a small amount of coprecipitated silica gel. Other suitable hydrogenation catalysts include, in general, the oxides and/or sulfides of Group VI–V and/or Group VIII metals of the Periodic Table, preferably, supported on adsorbent oxide carriers, such as alumina, silica, titania, zirconia, and the like.

The operating conditions satisfactory for the desired conversion of these unsaturated hydrocarbons and the saturated hydrocarbons include a temperature from 600° F. to 850° F., a pressure from 500 to 3,000 p.s.i.g., liquid hourly space velocities from 0.5 to 10, and a hydrogen-to-oil ratio equivalent to 500 to 15,000 s.cf./b. Other operating conditions may be found by those skilled in the art to be satisfactory; therefore, it is to be noted that these operating conditions, per se, are not critical. The conditions only need be sufficient to saturate the unsaturated hydrocarbons to the extent desired by consuming at least part of the hydrogen in the carrier gas and without cracking or fragmenting of the sample into lower molecular weight products.

Examples of suitable carrier gases include helium, nitrogen, argon, air and methane, steam and carbon dioxide, and the like. The packing material in the chromatographic column can be of the adsorbent type, such as charcoal, alumina, silica gel, molecular sieve material, and the like. Liquid partition columns containing an inert solid coated by solvent, such as hexadecane, octyl sebacate or benzyl ether, can also be employed. In a broad sense, the chromatographic column portion of the present invention is conventional and those skilled in the art are familiar with the requirements of constructing such a column.

As previously mentioned, the essence of the present invention is predicated on detecting quantitatively the hydrogen "loss peak" from the effluent of the chromatographic column. Therefore, the carrier gas comprises an inert diluent such as those mentioned above and a known amount of hydrogen. This known amount of hydrogen may be varied considerably, but generally will be present in an amount from 10% to 50% by volume of the total carrier gas. Particularly beneficial results have been obtained utilizing approximately 20% hydrogen in nitrogen as the carrier gas.

The detection device suitable for determining quantitatively the presence of hydrogen in the effluent stream is conventional and known to those skilled in the art. Hydrogen has such a high thermal conductivity compared to the gases that a conventional Wheatstone bridge circuit can be used as a measure of the amount of hydrogen present in the effluent from the chromatographic column. The hydrogen "loss" determination is, therefore, a measure of the unsaturated hydrocarbons present in the original sample to be analyzed. Of course, other hydrogen detectors may be used, such as electrochemical methods, mass spectrometers, catalytic combustion methods, etc. The detection device itself in the practice of this invention need only be as accurate as the desired result should be as previously mentioned hereinabove.

The preferred embodiment of this invention comprises the application of the inventive method to a continuous analysis of unsaturated hydrocarbons which are non-cyclic in structure and which, preferably, contain from 9 to 16 carbon atoms per molecule. It is distinctly preferred that these unsaturated hydrocarbons comprise $C_{11}$, $C_{12}$, and $C_{13}$ non-cyclic olefinic hydrocarbons in admixture with corresponding n-paraffin hydrocarbon components. For example, there has recently been developed a dehydrogenation reaction for the production of mono-olefin hydrocarbons from n-paraffin hydrocarbons of the type referred to herein utilizing a catalytic agent. The function of the particular catalyst is to permit the dehydrogenation of the paraffins to the mono-olefins without isomerization of the normal paraffins or the resulting mono-olefins to the corresponding branched chain analogues.

Suitable catalytic agents for use in such a paraffin dehydrogenation reaction include the oxides of the elements of Group VI and metal sulfides and/or oxides of the metals of Group VIII of the Periodic Table. The preferred normal paraffin dehydrogenation catalyst comprises the noble metals or metal compounds, such as platinum or palladium disposed on a neutral or basic support, such as alumina.

Typical operating conditions for the normal paraffin dehydrogenation reaction zone utilizing the preferred catalyst hereinabove include relatively mild conditions of temperature and pressure, such as a temperature of about 870° F. and a pressure of about 30 p.s.i.g. Sufficient hydrogen is added to the reaction zone so that a mol ratio of hydrogen to combined feed of about 8 is maintained in the dehydrogenation reaction zone.

The total hydrocarbon effluent containing a mixture of n-paraffin hydrocarbons and non-cyclic olefinic hydrocarbons containing from 9 to 16 carbon atoms per molecule is then, preferably, admixed with benzene and passed into an alkylation reaction zone utilizing a catalytic agent, such as hydrofluoric acid, to produce an aromatic product comprising a hydrophobic group which is then suitable for sulfonation and the production of high quality detergent compounds.

The present invention is, preferably, directed to the analysis and monitoring of the hydrocarbon effluent from the dehydrogenation reaction zone and/or the subsequent feedstock to the alkylation reaction zone.

We claim:
1. Method for the continuous determination of the amount of chemical unsaturation of a process stream comprising saturated and unsaturated hydrocarbons which comprises:
 (a) admixing said stream with a carrier gas comprising an inert diluent and a known amount of hydrogen;
 (b) introducing the resultant mixture into a conversion zone under conditions sufficient to saturate said unsaturated hydrocarbons thereby consuming at least part of said hydrogen;
 (c) passing the total effluent from the conversion zone into a chromatographic separation zone under con- ditions sufficient to separate hydrogen from the hydrocarbons contained in the conversion zone effluent;

(d) determining the amount of the hydrogen which emerges from said separation zone; and (e) determining from said amount of the hydrogen the amount of hydrogen in said effluent as a measure of the unsaturated hydrocarbons present in said process stream.

2. Method according to claim 1 wherein said carrier gas comprises from 10% to 50% by volume hydrogen.

3. Method according to claim 2 wherein said inert diluent is nitrogen.

4. Method according to claim 2 wherein said conversion zone contains a hydrogenation catalyst.

5. Method according to claim 4 wherein said unsaturated hydrocarbon is non-cyclic in structure and contains from 9 to 16 carbon atoms per molecule.

References Cited

Brown, C. A. et al., Analytical Chemistry, vol. 39, pp. 823–6 (June 1967).

McMillan, W. A., et al., Analytical Chemistry, vol. 8, pp. 105–7 (March 1936).

Sedlak, M., Analytical Chemistry, vol. 38, pp. 1503–8 (October 1966).

MORRIS O. WOLK, Primary Examiner

E. A. KATZ, Assistant Examiner

U.S. Cl. X.R.

23—232, 253, 254